A. W. SMITH.
TYPE WRITING MACHINE.
APPLICATION FILED MAR. 8, 1913.
1,110,464.
Patented Sept. 15, 1914.
8 SHEETS—SHEET 1.
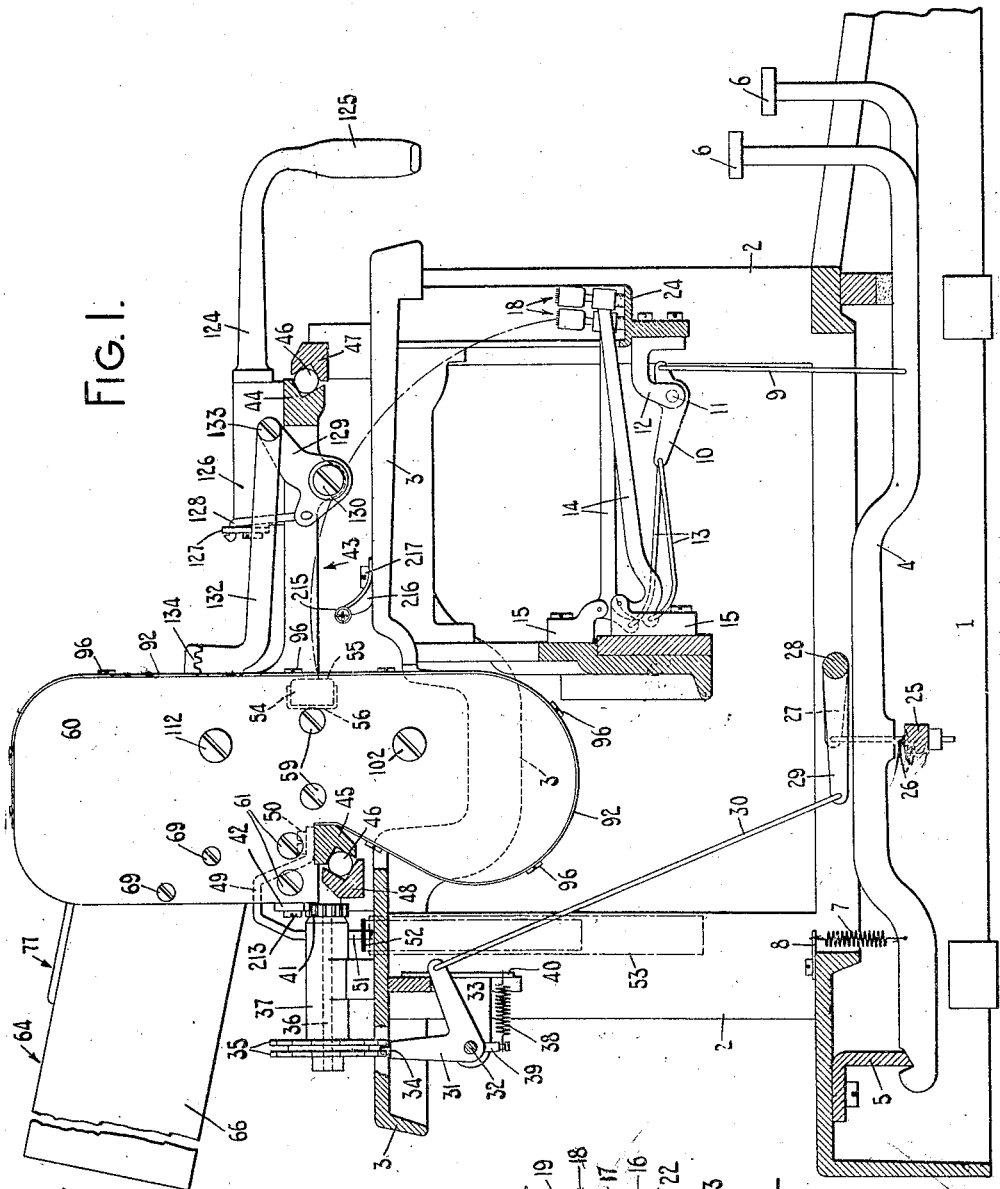
WITNESSES:
INVENTOR:
Arthur W. Smith
By Jacob Felbel
HIS ATTORNEY

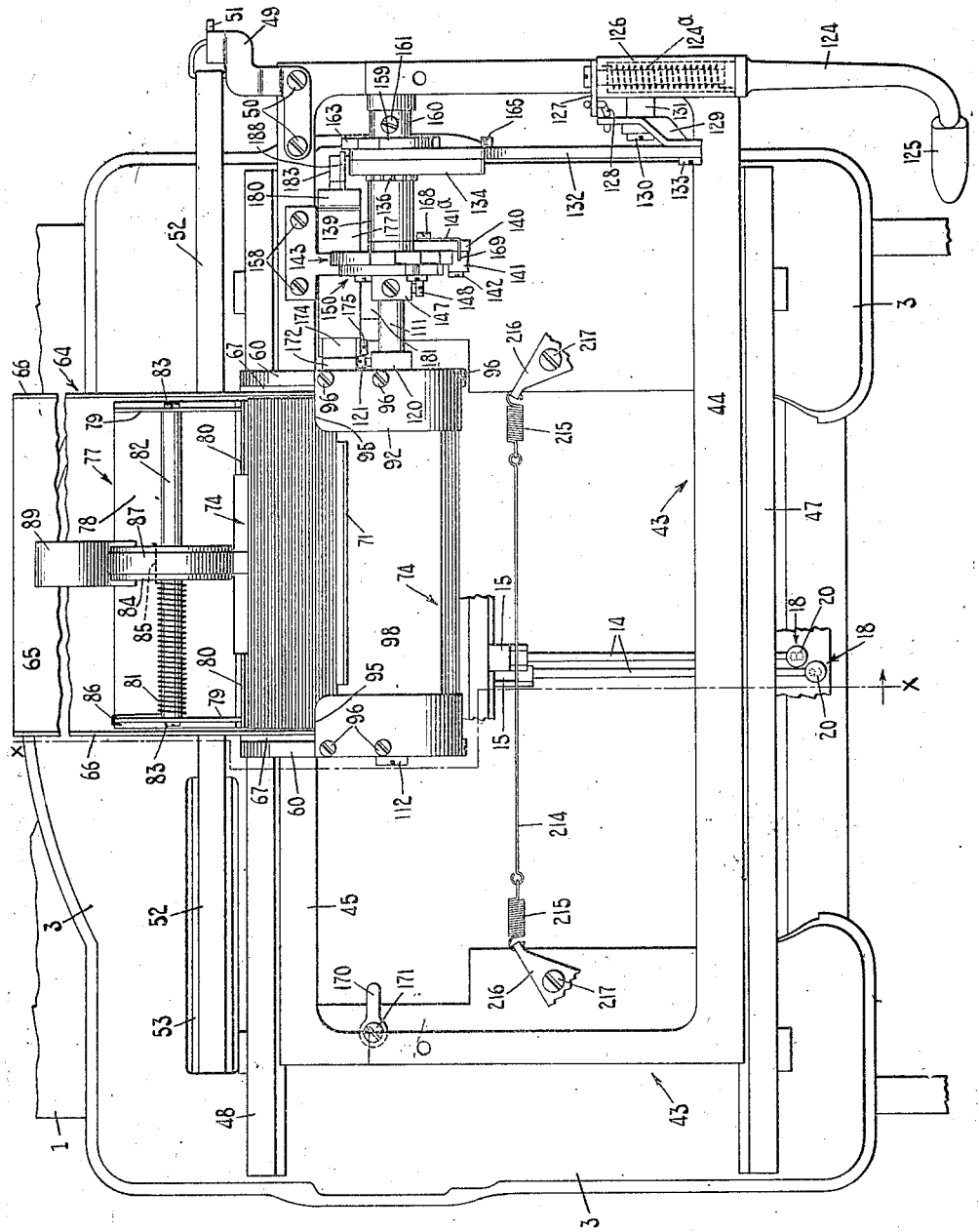

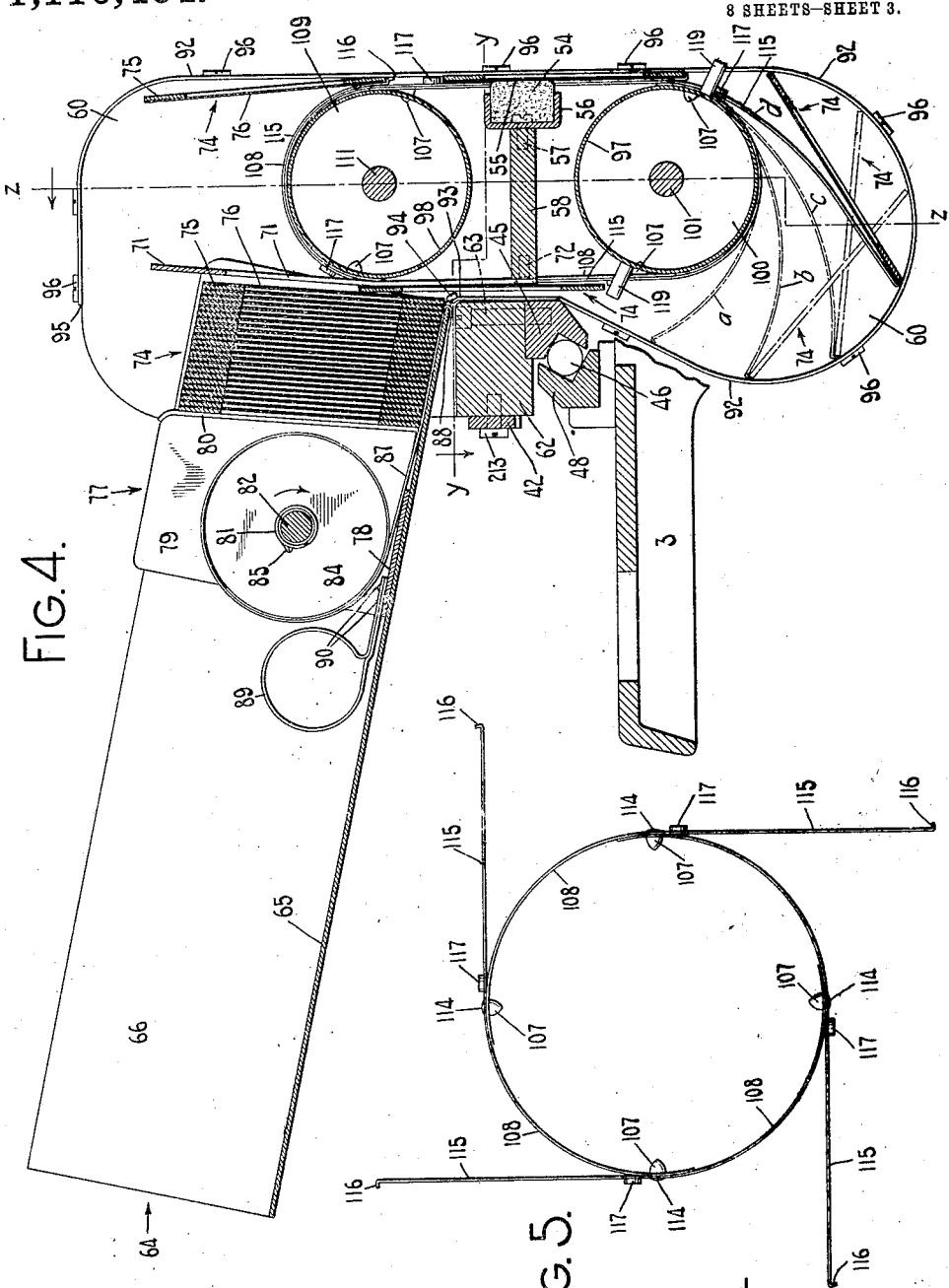

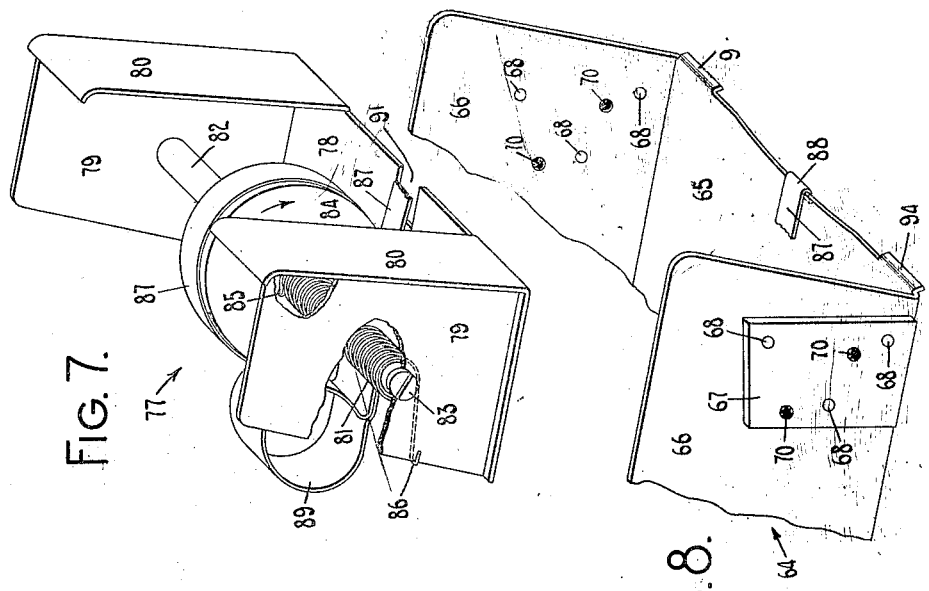

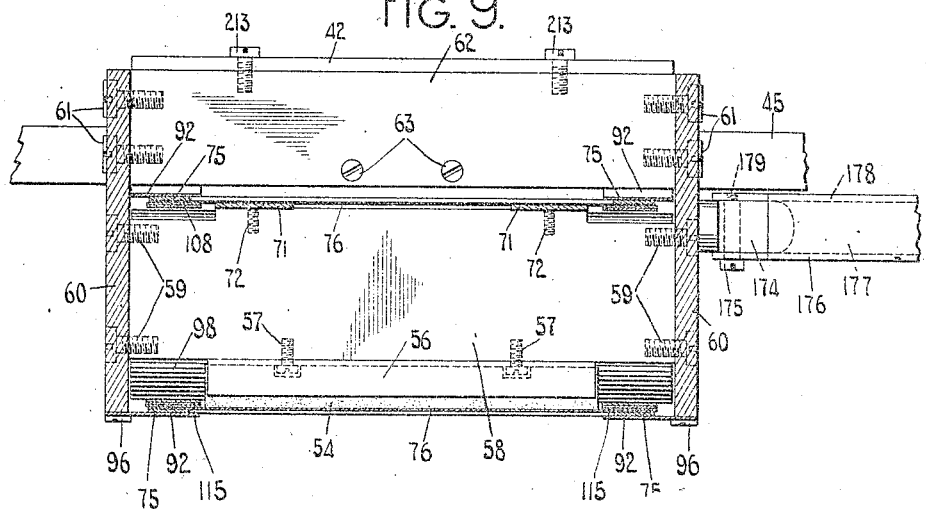

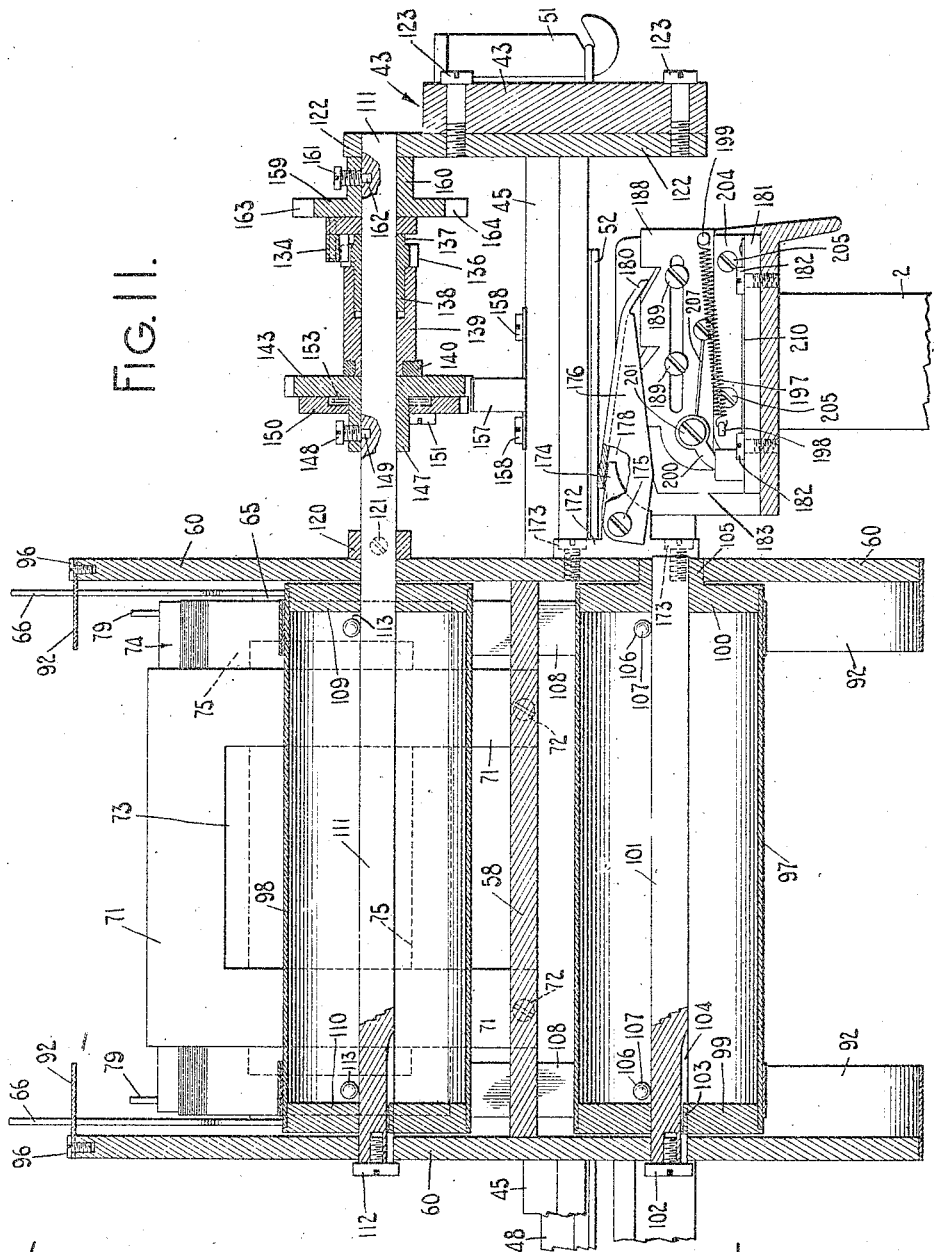

A. W. SMITH.
TYPE WRITING MACHINE.
APPLICATION FILED MAR. 8, 1913.
1,110,464.
Patented Sept. 15, 1914.
8 SHEETS—SHEET 7.
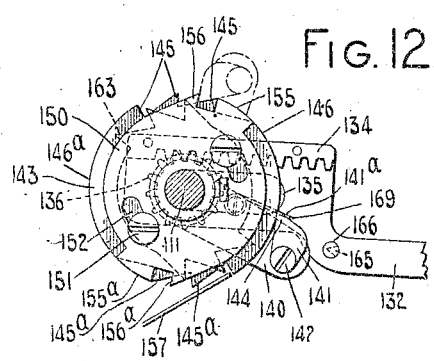
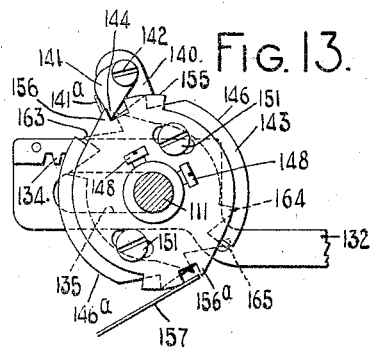
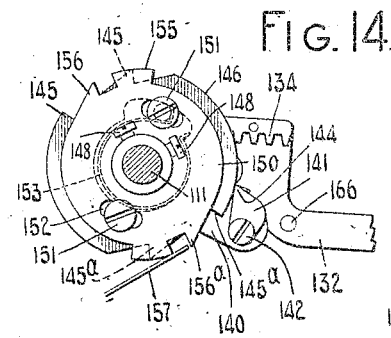
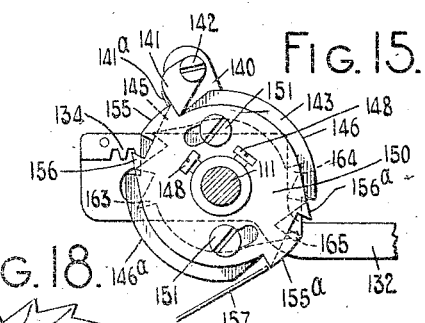
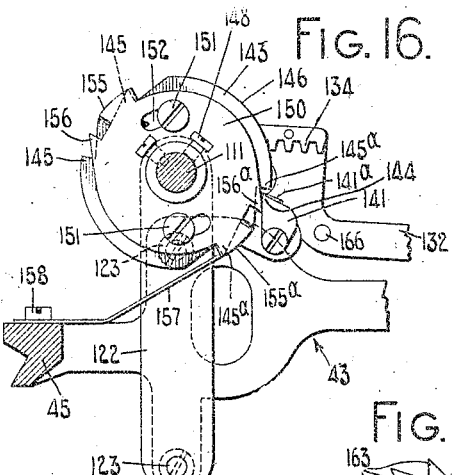
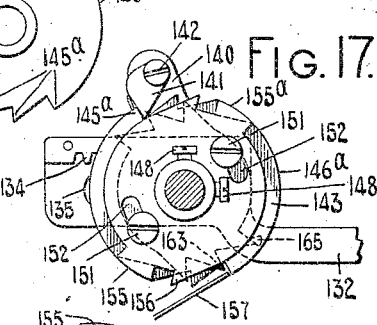
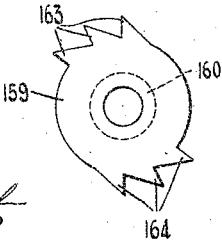
WITNESSES:
INVENTOR:
Arthur W. Smith
By Jacob Felbel
HIS ATTORNEY

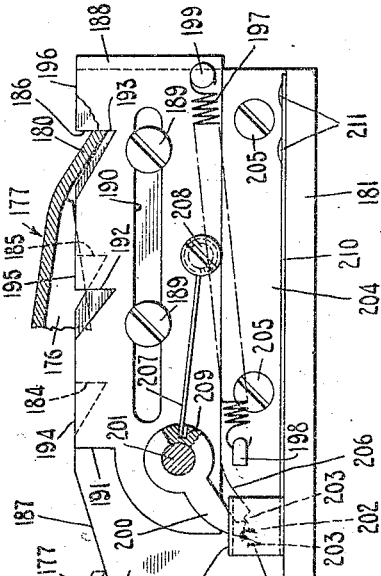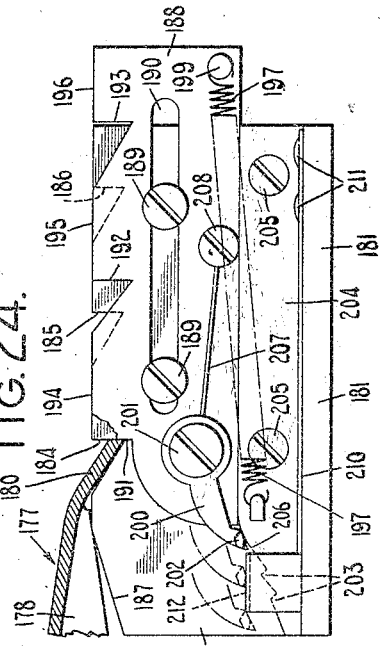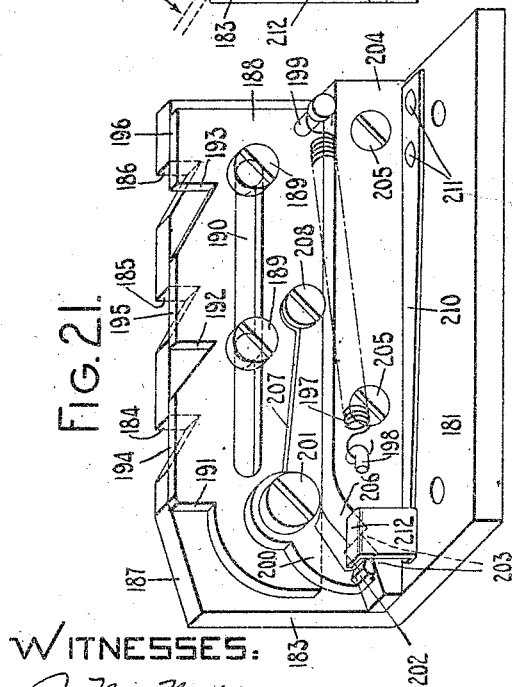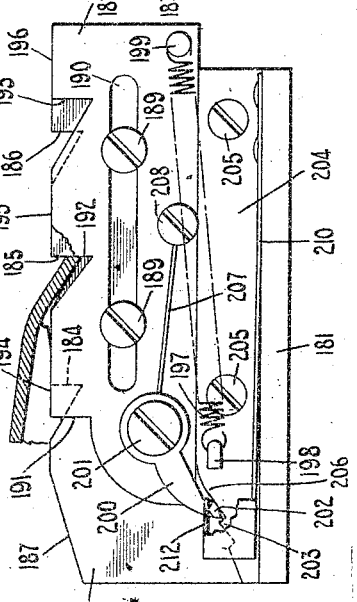

UNITED STATES PATENT OFFICE.

ARTHUR W. SMITH, OF NEW YORK, N. Y., ASSIGNOR TO REMINGTON TYPEWRITER COMPANY, OF ILION, NEW YORK, A CORPORATION OF NEW YORK.

TYPE-WRITING MACHINE.

1,110,464. Specification of Letters Patent. Patented Sept. 15, 1914.

Application filed March 8, 1913. Serial No. 752,848.

*To all whom it may concern:*

Be it known that I, ARTHUR W. SMITH, citizen of the United States, and resident of the borough of Manhattan, city of New York, in the county of New York and State of New York, have invented certain new and useful Improvements in Type-Writing Machines, of which the following is a specification.

My invention relates to typewriting machines and more particularly to means for controlling separate work sheets or cards in their movements with reference to the printing point.

The main object of my invention, generally stated, is to provide comparatively simple mechanism of the character specified which is reliable and efficient in operation and by means of which the separate sheets or cards may be quickly positioned and filled in or written.

Considered from a more specified aspect, the invention may be said to have the following objects in view: (1st) to provide improved means for handling work sheets or cards in a flat condition from the time they are introduced into the machine until they are discharged therefrom; (2nd) to provide improved means by which a plurality of work sheets or cards may be moved along a container to a position from which they are conveyed from said container; (3rd) to provide improved means for feeding and guiding the work sheets or cards to the printing line; (4th) to provide improved means for discharging the work sheets or cards from the machine after they have been filled in or "written" and after they leave the printing line; (5th) to provide improved automatically operating means by which different extents of feed of the work sheets or cards may be effected at different actuations of a handle to provide the requisite feed for spacing between lines and for bringing a new card into position to receive the first line of writing; (6th) to provide improved simple and effective means for discharging written work sheets or cards from the machine; (7th) to provide improved automatically operating means for arresting the carriage at successively different points at successive return movements of the carriage to facilitate writing addresses on the work sheets or cards; and (8th) to so construct any or all of the above mentioned means that work sheets or cards may be handled in a flat condition.

To the above and other ends which will hereinafter appear, my invention consists in the features of construction, arrangements of parts and combinations of devices set forth in the following description and particularly pointed out in the appended claims.

In the accompanying drawings in which like reference characters indicate like parts in the various views, Figure 1 is a vertical fore and aft sectional view of the machine with parts omitted, the section being taken on the line $x$—$x$ of Fig. 3 and looking in the direction of the arrow at said line. Fig. 2 is a detail fragmentary side view, partly in section, of one of the type bars, the view showing the type carrying end of the bar. Fig. 3 is a fragmentary top plan view of the machine. Fig. 4 is a fragmentary fore and aft vertical sectional view showing the card container or hopper, the card feed mechanism and some of the associated parts, the section being taken to the left of a median line through the hopper. Fig. 5 is a detail side view of one of the carriers or endless bands which carry the card feeding arms or devices. Fig. 6 is a view that corresponds to Fig. 4 with some of the parts disclosed in the last mentioned view omitted and showing a slightly different disposition of the parts. Fig. 7 is a fragmentary detail perspective view of the follower and the means by which it is moved. Fig. 8 is a fragmentary detail perspective view of the discharge end of the hopper. Fig. 9 is a horizontal sectional view taken on the line $y$—$y$ of Fig. 4 and looking in the direction of the arrow at said line. Fig. 10 is a diagrammatic side view of the machine and the receptacle into which the cards are shot when they are discharged from the machine. Fig. 11 is a vertical transverse sectional view taken on the line $z$—$z$ of Fig. 4 and looking in the direction of the arrow at said line. Figs. 12 to 17 inclusive are fragmentary side views, with parts in section, of a portion of the line spacing mechanism by which movement is transmitted to the card feeding bands, the different views showing different dispositions of the parts. Fig. 18 is a detail side view of the line spacing ratchet wheel. Fig. 19 is a detail side view of the locking wheel for the line spacing mechanism. Fig. 20 is a detail perspective view of the automatically actuated controlling member for the line spacing mechanism. Fig. 21 is an enlarged detail perspective view of the margin stop mechanism. Figs. 22, 23 and 24 are enlarged side views of the same with parts in section and parts broken away, these views showing different dispositions of the parts.

The invention in the present instance is embodied in a stencil "writing" machine in which needle faced types are employed for impressing the outline of the characters thereon in the stencil sheets or "cards" by puncturing them, the cards being afterward used in an addressing machine. It should be understood, however, that this represents but one embodiment of my invention and that it may be embodied in various styles of typewriting machines, whatever the character of the printing or writing instrumentalities and whatever the character of the work sheets or cards employed or operated on. When, therefore, the terms "writing," "typewriting," "types," "printing instrumentalities," "cards" or "work sheets" or like terms are employed, these terms are used in a broad sense and are not confined to the specific forms of devices or articles shown.

The frame of the machine comprises a base 1, corner posts 2 and top plate 3. The type actions shown in the present instance each comprises a key lever 4 fulcrumed on a fulcrum bar 5 and extending forwardly to the keyboard of the machine where it is provided with a finger key 6. A returning spring 7 is connected at one end to a plate 8 secured to the base of the machine and at its opposite end to the associated key lever. An upwardly extending link 9 connects each key lever with an associated sub-lever 10 pivoted at 11 to a hanger 12. A rearwardly extending arm of each sub-lever 10 is connected to a link 13 which in turn is connected to the heel of the associated type bar 14. The various type bars are mounted on hangers 15 and are pivoted to swing upwardly and rearwardly to the printing point. The forward end of each type bar is provided or formed with a socket 16 having a conical opening therein for the reception of a conical stem 17 of a type block 18. The so-called type block is formed as a cup-like member 19 which receives the needles 20 forming the type at their upper pointed ends. The needles may be secured in place in the socket 19 by soft metal, as indicated at 21. A socket 22 surrounds each type bar socket 16 and extends downwardly therefrom to provide a bearing opening for a soft pad 23 made of felt or other suitable material. The pad 23 on each type bar is shown in the present instance as cylindrical in form and is of sufficient area to receive the impact of any of the types formed by the needles 20. It will be observed that these pads normally rest upon a segmental type bar support 24 carried by the segment for the hangers 12 and each pad constitutes a resilient support for the associated type bar. It will be understood that each pad 23 is so situated that it will be presented, when its type bar is at the printing point, in a position so as to constitute an impact pad against which the needle faced types of any of the subsequently actuated bars may strike. Thus it will be understood that the pads 23 constitute means for preventing injury to the needle faced types in the event of collision between the type bars at the printing point. The manner of constructing the needle faced types and the safety pads for preventing injury thereto are not of my invention.

The escapement mechanism is or may be of the ordinary construction such as that employed in the No. 10 or No. 11 Remington machine, for example, and in which a universal bar 25 extends beneath the key levers 4 and is supported at its ends by links 26 which extend upwardly therefrom to crank arms 27 which project rearwardly from the rock shaft 28 pivoted to turn on bearing screws secured in the base of the machine. A centrally disposed rearwardly projecting crank arm 29 extends from the rock shaft 28 and is connected to an upwardly extending link 30. The upper end of this link is connected to a dog rocker 31 pivoted at 32 to a bracket 33. A feed dog 34 is carried by the dog rocker and cooperates with a double escapement wheel 35 carried by an escapement wheel shaft 36 which turns in a bearing opening in a bracket 37 fixed to the top plate of the machine. A contractile spring 38 is connected at one end to a pin 39 which projects from the dog rocker and at its opposite end to a plate 40 secured to the bracket 33. The forward end of the escapement wheel shaft carries a feed pinion 41 with which a feed rack 42 coöperates. This feed rack is fixed to the carriage in a manner which will hereinafter more clearly appear. The carriage which is designated as a whole by the reference numeral 43 comprises a rectangular frame provided with a front grooved guide rail 44 and a rear grooved guide rail 45. Anti-friction balls or rollers 46 are received in these grooved guide rails and are also received in oppositely grooved fixed guide rails 47 and 48. A bracket 49 is fixed at the right-hand end of the carriage by screws 50 and is provided with a depending hook 51 to which one end of the band 52 is connected. The opposite end of this band is secured to a spring drum 53 by which the carriage is propelled in its step-by-step feed movement from right to left.

A platen 54 is in the present instance fixed to the carriage to move therewith and comprises an oblong strip of felt or like material which presents a forward flat impact face 55 to the front of the machine and which is adapted to receive the impact of the needle faced types. This platen is received within a substantially U-shaped sheet metal container 56 fastened by screws 57 to a bar 58. The bar 58 is fixed at its ends by screws 59 to parallel supporting plates 60. These plates are fixedly connected by screws 61 to a horizontally disposed bar 62 which in turn is secured to the rear carriage rail 45 by screws 63. It will be seen, therefore, that the platen 54, plate or bar 58, parallel side plates 60 and bar 62 are all fixedly connected together and are secured to the carriage to move therewith.

A support is provided on the carriage in the rear of and above the platen for a plurality of work sheets or cards. In the present instance this support is in the nature of a container, chute or hopper, designated as a whole by the reference numeral 64 and comprises a bottom wall 65 and parallel side walls 66, which latter are preferably spaced apart to correspond to the length of the work sheets or cards received in the hopper. Each side wall 66 of the hopper is provided with a spacing plate 67 which is riveted thereto as at 68. Screws 69 extend through the side plates 60 and are received in tapped openings 70 (see Fig. 8) in the spacing plates 67. The hopper is thus fixedly connected to the carriage and is supported at an inclination to a horizontal plane, as shown in Fig. 4. The forward open end of the hopper terminates at a substantially inverted U-shaped supporting plate 71 which is best shown in Figs. 4 and 11. The depending arms of this supporting plate are secured by screws 72 to the plate or bar 58. A rectangular opening 73 is thus provided in the supporting plate 71 but the body portion of the plate extends up in front of the discharge end of the hopper and constitutes a support for the work sheets or cards. In the present instance these work sheets or cards are in the nature of stencil plates or stencil "cards" each of which is designated as a whole by the reference numeral 74. Each card, in the present instance, comprises a rectangular cardboard frame 75 covered on one side with a thin sheet of paper 76 which may be pasted or otherwise affixed to the rectangular frame 75. These cards, as will be seen, are arranged on end in the hopper 64 and are supported one next to another against the supporting plate 71 at the forward end of the hopper.

I have provided automatically operating means for moving the cards along the hopper to the point of discharge therefrom. These means are best shown in Figs. 3, 4 and 7, the latter of which figures shows the construction in detail. The mechanism in question comprises a follower, which is designated as a whole by the reference numeral 77. This follower comprises a base 78 which is supported on the base 65 of the hopper and carries upwardly extending side plates 79 and upwardly extending front contact plates 80. The widthwise dimensions of the follower correspond substantially to the width of the hopper so that the follower is prevented from turning or skewing in its movement along the hopper. From an inspection of Fig. 7 it will be seen that the contact plates 80 of the follower are spaced apart so as to provide an intermediate opening between them while the front contact faces of these plates are adapted to bear against the group of cards contained in the hopper and force the cards toward the discharge end thereof.

Motion is transmitted to this follower by a coiled spring 81 which surrounds a spindle 82 carrying headed pivot screws 83 which are received in bearing openings in the side walls 79 of the follower. A centrally disposed drum or disk 84 is fixed on the rotative spindle 82 and one end of the spring 81 is fixed to the drum, as indicated at 85. The opposite end 86 of the spring is fixed to one of the end plates 79 of the follower. The force of this spring, therefore, is exerted to turn the drum 84 and spindle 82 in the direction of the arrows at Figs. 4 and 7. A band 87 is secured at one end to the drum or disk 84 and is connected at its opposite end as at 88 to the front edge of the bottom wall 65 of the hopper, as shown in Figs. 4 and 8. This end of the band is therefore anchored at 88, whereas the opposite end thereof is connected to the drum 84. The power of the spring is effective to turn the drum and thus force the follower as a whole along the hopper toward the discharge end thereof. In order to facilitate moving the follower against the power of its spring 81 in the opposite direction, I have provided the follower with a finger piece or loop 89 riveted at 90 to the base piece 78 of the follower. This finger piece or loop enables the operator to move the follower along the hopper toward the rear open end thereof when a new batch of cards is to be placed in the hopper. By releasing the hooked end 88 from its point of anchorage the follower as a whole may be removed from the machine. As indicated in Fig. 7 I have provided a cut-out 91 in the bottom wall of the follower to enable the band to pass through such cut-out or opening in order that the forward end portion of the band may lie snug against the bottom wall of the hopper and not interfere with the cards as they are fed along the hopper.

I have provided means for guiding and feeding the cards successively from the hopper to the platen while the cards remain in a flat condition and for discharging the cards from the machine after they pass the printing line and have been appropriately inscribed or written. The guiding means comprises two curved guiding surfaces 92 which are spaced apart and arranged so as to coöperate with the cards at opposite end portions thereof. The inner face of each guide 92 forms a continuous guiding surface which extends from the point 93 where it underlies a depending flaring projection 94 (see Figs. 6 and 8) projecting from the bottom wall 65 of the hopper to the point 95 at which the cards are discharged from the machine. Each of these guides is secured to and projects inwardly from one of the supporting plates 60, screws 96 securing the guides to said plates. The guides are thus secured to the edges of the plates 60 and conform to the outline of the plates.

The feeding means comprise two drums 97 and 98 which are substantially surrounded by the guides 92. The drum 97 is fixed to heads 99 and 100 (see Fig. 11) each provided with a central bearing opening for the reception of a shaft or spindle 101. The spindle extends through a bearing opening in the left-hand supporting plate 60 and is tapped at its end to receive a headed screw 102. The head 99 is provided with a feather or projection 103 which is received in a spline groove 104 in the shaft 101 so as to fixedly connect the shaft and head 99 to turn together. The head 100 is formed with a hub 105 which is received in a bearing opening in the right-hand end plate 60. The drum 97 may be soldered or otherwise secured to the heads 99 and 100. The drum 97 near each end thereof is provided with a series of circularly arranged openings 106 in which projections 107, on two flexible endless bands or carriers 108 which surround the drum, are adapted to engage. The endless bands 108 also pass around the drum 98. This last mentioned drum is soldered or otherwise secured to heads 109 and 110, the latter of which is splined to a shaft 111 in the same manner as the head 99 of the drum 97. This shaft is supported in bearing openings in the supporting plates 60 and is tapped at the left-hand end thereof to receive a headed screw 112. The drum 98 is also provided with two series of circularly arranged apertures 113 in which the projections 107 on the bands are adapted to engage so as to form a positive connection between the two bands 108 and the drums 97 and 98. One of the endless bands or carriers 108 is shown in detail in Fig. 5. Each carrier is preferably made of four strips of spring metal or other suitable resilient material. These strips are riveted together at 114 by the same rivets which secure the projections 107 to the endless band. Each strip is extended beyond the point of its connection 114 to form a resilient device, member or spring arm 115 which, as shown in Fig. 5, is tensioned to move toward a tangential position such as that shown. The four strips of resilient metal of each carrier thus united constitute the endless band and also form four spring arms which are carried by or fixed to the band and move therewith and are adapted to have a movement independently of and relatively to the band, as will hereinafter more clearly appear. While the endless band is shown of circular form in Fig. 5, it will be understood that this is due to the fact that it is shown free from restraint in this view and that when the band is in place upon the drums 97 and 98 it takes the shape or path illustrated in Figs. 4 and 6. In the construction of the band thus described the arms 115 in fact form part of the endless band but for convenience of description they will be treated as separate parts; that is to say, the endless band will be described as such and as carrying arms 115. It will be seen that the free end of each of the arms 115 is provided with a bent end or hook-like engaging portion 116 and that each arm also carries a projection or abutment 117. From an inspection of Fig. 4 it will be seen that the space between the engaging portion 116 and the abutment 117 on each of the bands is slightly greater than the distance from the top to the bottom of one of the cards. From an inspection of Fig. 11 it will be observed that the bands 108 and the arms which are carried thereby are situated on opposite sides of the supporting member 71 which supports the cards at the discharge end of the hopper 64. Moreover it will be seen that the bands and spring arms are so situated that in the rotative movement of the bands the free ends of the arms 115 are adapted to co-act with the inner continuous guiding surfaces of the guide members 92.

In the operation of this mechanism motion is transmitted to the shaft 111 in a manner to be hereinafter described and this movement is effective to turn the driving drum 98. The rotative movement of the drum 98 is effective to turn the endless bands 108 and the cylinder or drum 97 around which they pass. The arms on both bands 108 have the same relative disposition and the rotation of the drum 98 brings one pair of arms 115 to the full line position shown in Fig. 6. When the parts are thus disposed the hook-like engaging members 116 on these arms are located directly above the foremost card 74 in the hopper 64 so as to overlap the top edge thereof. Further movement of the drum 98 in the direction of the arrow in Fig. 6 is effective to bring the engaging members 116 on the uppermost arms into contact with the upper edge of the first card and force it down from the hopper while the remaining cards of the group are retained in the hopper. As this movement of the arms with the bands continues the engaging ends 116 of the arms continue to move the card downwardly toward the bottom of the curved guides 92, the arms contacting at their free ends with the guides and following a path of movement such as is indicated in Fig. 4. Four different successive positions of a companion set of arms 115 are indicated in this view and designated by the reference characters $a$, $b$, $c$ and $d$ respectively. It will be understood from these different positions of the set of arms 115, especially when compared with the set of arms just above them which are moving a card from the hopper, that the spring arms of each band in some positions are so guided at their free ends that they conform substantially to the outline, surface or contour of the endless band in its movement around the drums, whereas in other posititons the spring arms are flexed at their free ends away from the bands so that they assume different angular relations to the surface of the band. It will be understood from the positions $a$, $b$, $c$ and $d$ shown in Fig. 4 that while the cards when they are fed from the hopper move in a curved path around the drum 97 they nevertheless remain in a flat condition and continue to be engaged by the hook-like ends of the spring arms which sweep around and contact with the inner guide faces of the guides 92 to positively engage the cards and move them upwardly around the drum 97 to the platen 54. This engagement between the spring arms and the cards is maintained during the movement of the cards around and past the platen and until after the cards have been written or inscribed and have left the platen and continued to the point of discharge. From an inspection of Fig. 4 it will be seen that the parts are so disposed in this view that one card has been moved downwardly from the hopper, whereas a second card is engaged by another set of arms at the lower portion of the guides 92. A third card is arranged at the platen in a position to receive the first line of writing, whereas the fourth card has been moved upwardly from the platen and is about to discharge the same from the machine. A single line space movement of the carriers from the position shown in Fig. 4 is effective to bring the third card into position to receive the second line of writing, the parts at this time moving to the positions shown in Fig. 6.

It will be seen that in this view the upper set of arms has been freed from control of the guides 92 by the line space movement and has moved successively to the different positions indicated respectively at $e$, $f$, $g$, $h$ and $i$. This movement is due to the inherent resiliency of the arms which moves them from the bent position around the cylinder or drum 98 to the tangential position indicated at $i$ where they are arrested by contact with the first card 74 of the group contained within the hopper. The sudden release of the flexed spring arm effected in the manner described, causes the card engaged thereby to follow some such curved path of movement as that indicated by the different positions of the card 74 in Fig. 6 and to shoot or propel the card with considerable force rearwardly over the hopper and over the cards contained therein to a suitable receptacle A, as indicated by the dotted line in Fig. 10. This receptacle may be of any suitable character, although I have provided a special receptacle for this purpose which comprises an upright box having the front wall terminating at 118 and its rear and side walls extending a considerable distance above the front wall in order to receive cards which may be shot or propelled from the machine. The width of this receptacle is preferably such that it is adapted to receive a card through the opening in the front wall thereof, irrespective of the position of the carriage in its line of travel.

I have provided a plurality of so-called safety pins or contacts 119 which, as shown in the present instance, are oppositely disposed on and project from the outer surface of the cylinder or drum 97 about midway in the length thereof. The purpose of these pins is to prevent a card from being advanced by its spring arms too rapidly in the feed of the cards through the machine, with the possibility of the cards jamming. Thus, from an inspection of Fig. 4, it will be understood that if the released arms in moving successively from the positions $a$, $b$, and $c$ to the position $d$ should propel the card ahead of the arms after the latter is arrested, there might be an opportunity for the advancing card to engage in the constricted opening or space between the guides 92 and the lower front portion of the drum 97. However, the position of one of the pins 119 at this time prevents the upper edge of the card from entering the constricted opening and thus prevents any liability of a card choking between the guide and the cylinder at this point.

I have provided means for intermittently rotating the shaft 111 in order to effect a rotative movement of the carriers 108 to provide for spacing between lines as the cards are being written and to move the cards successively up into position in front of the platen to receive the first line of writing and to discharge the cards from the machine in the manner hereinbefore described. The means for rotating the shaft 111 is as follows: A collar 120 is secured by a set screw 121 on the shaft 111 to the right of the right-hand supporting plate 60. The shaft 111 is prolonged and receives a bearing at its right-hand end in a bracket plate 122 which is fixed by screws 123 to the right-hand end bar of the carriage 43. From an inspection of Figs. 1 and 3 it will be seen that a rock shaft 124 extends forwardly and then downwardly to provide a finger piece 125 by which the shaft may be rocked. A spring 124ª surrounds the shaft and is contained within the bearing therefor. This spring returns the shaft and the parts connected therewith to normal position. This shaft receives a bearing in a bearing member 126 secured to the right-hand end bar of the carriage. The rear end of the rock shaft has a crank arm 127 fixed thereto. This crank arm is connected to a depending link 128 which is connected at its lower end to one arm of a bell crank lever 129 pivoted on a pivot screw 130 which extends through a spacing sleeve 131 and is received in a tapped opening in a depending lug on the right-hand end bar of the carriage. An arm or slide 132 is pivoted at 133 to the other arm of the bell crank lever and is provided at its rear end portion with a rack 134, the teeth of which extend from the inner side of the member 132. From an inspection of Figs. 12 and 13 it will be seen that the member 132 is slotted at 135 beneath the rack, the slot extending fore and aft of the machine. The shaft 111 extends through this slot so as to form a support for the rear end of the member 132 to support and guide it in its movements fore and aft of the machine. This rack overlies and is adapted to engage a pinion 136 which surrounds the shaft 111. From an inspection of Fig. 11 it will be seen that this pinion has a hub-like portion 137 which bears at its end against the rack carrying member 132 to prevent a movement of the latter to the left. The pinion is also provided with a hub-like member 138 which is received in an opening in a sleeve 139 and is secured thereto by a drive fit. A crank arm 140 is received on the left-hand reduced end of this sleeve and is fixedly connected thereto by riveting up of the reduced end of the sleeve. The construction is such that the pinion 136, sleeve 139 and crank arm 140 are fixed to turn together but are free to turn on the shaft 111. A pawl or actuating member 141 is pivoted by a headed screw 142 to the outer end portion of the crank arm at one side thereof. The pawl is thus arranged on one side of the crank arm and overlaps a mutilated spacing wheel 143, the engaging nose 144 of the pawl being adapted to engage the wheel, as will hereinafter more clearly appear. This spacing wheel is shown in detail in Fig. 18 from which it will be seen that the wheel has two sets of teeth 145 and 145ª on diametrically opposite sides thereof, three teeth being provided in each set, these teeth being spaced apart a uniform distance. Intermediate these two sets of teeth there are formed two intermediate dwells 146 and 146ª. The effect, therefore, is to provide a long space between the last tooth of each set of three teeth and the first tooth of the other set. The engaging nose of the pawl is adapted to ride on the dwells 146 and 146ª, as will hereinafter appear, the pawl being forced toward the wheel by a spring 141ª (see Figs. 3 and 12). From an inspection of Fig. 11 it will be seen that this wheel 143 is provided with a hub 147 tapped to receive screws 148, the reduced ends 149 of which are adapted to be seated in openings in the shaft 111 to fixedly connect the wheel of the shaft.

Arranged adjacent to the wheel 143 is a rotative controlling device, disk, toothed member, or shield 150 which is shown in detail in Fig. 20. This controlling device is mounted to turn on the hub 147 of the wheel 143 and is connected to the wheel by means of headed screws 151 which extend through slots 152 in the controlling device and are received at their ends in tapped openings in the wheel 143. It will be observed from an inspection of Fig. 20 that the controlling device is cut out on the side next to the wheel 143 to receive a C-spring 153 which bears at one end against a shoulder 154 formed on the controlling member, the opposite end of the spring bearing against one of the screws 151. The force of this spring is exerted to normally maintain the controlling member in a rotative position with reference to the wheel 143 where one end of each slot 152 bears against its associated screw 151, as indicated in Fig. 12. On diametrically opposite sides of the controlling member 150 are formed dwells 155 and 155ª. Ratchet teeth 156 and 156ª are formed on the member 150, one in the rear of each dwell. The construction is such that the pawl 141 is adapted to coöperate with the controlling member, as well as with the wheel 143, the width of the pawl being equal to the two members 143 and 150. A spring detent 157 (Fig. 16) is secured by a screw 158 to the rear cross bar or guide rail 45 of the carriage and coöperates at its free end with the controlling device 150 to hold it against the force of its spring 153 when the controlling device is shifted forwardly independently of the wheel 143, as will presently appear.

The operation of the spacing mechanism is as follows: The operator through a movement of the finger piece 125 to the right effects a rotative movement of the rock shaft 124, thus transmitting movement through the link 128, bell crank 129 and arm 132 to the rack 134, moving the latter rearwardly. The effect of this movement is to turn the pinion 136 and to effect a corresponding rotating movement of the crank arm 140, thereby moving said crank arm and pawl 141 from the position shown in full lines in Fig. 12 to that indicated in Fig. 13. This movement is effective to turn the shaft 111, the drum 98 positively connected thereto and the rotative carriers or bands 108, the bands rotating from right to left as the parts appear in Fig. 4. This is effective to move the cards successively from the hopper to the platen and finally to shoot the cards from above the hopper to the receptacle A, as hereinbefore explained.

The controlling device 150 automatically regulates or determines the point in the throw of the pawl 141 where engagement is effected between said pawl and the line spacing wheel 143. In order to facilitate an understanding of the operation of this automatically actuated controlling member, it may be well to point out that Figs. 1, 3, 4, 9, 11 and 12 represent the parts as they are disposed when a stencil card is positioned to receive the first line of writing, or immediately after the first line of writing has been completed, whereas Figs. 6 and 14 represent the parts as they are disposed when a card is in position to receive the second line of writing or immediately after said line has been completed, whereas Fig. 16 represents the parts as they are disposed when a card is positioned to receive a third line of writing or immediately after said third line has been written. With this understanding special reference is made to Fig. 12. Assuming that the parts represented in this figure, as shown in full lines, disclose the parts as they appear immediately after the first line has been completed, the operator will grasp the handle 125, moving it and the carriage to the right, thereby rocking the shaft 124 and effecting a rearward movement of the rack 134 through the intermediate connections, in the manner hereinbefore explained. This rotative movement of the crank arm 140 from the full line position shown in Fig. 12 causes the pawl 141 to ride over the dwell 146 on which the pawl rests. It will be seen that as the parts are disposed in Fig. 12 the dwell 155 forms in effect a continuation of the dwell 146 on which the pawl rises from the full line position. At this time the dwell 155 registers with the opening which is just in advance of the third of the teeth 145 on the line spacing wheel 143. The controlling member therefore prevents the pawl from entering this notch in advance of the third tooth 145 but as the pawl reaches the dotted line position shown in Fig. 12, it enters the space in advance of the second tooth 145 and is also brought into coöperative engagement with the tooth 156 on the controlling member. As the crank arm continues its movement, the pawl 141 will carry the controlling member 150 along with it against the power of its spring 153 and independently of the line spacing wheel. This movement of the controlling member is afforded by reason of the pin and slot connection 151–152 between the controlling member and line spacing wheel. The controlling member and pawl thus move together independently of the line spacing wheel until the pawl is brought into engagement with the second tooth 145 on the line spacing wheel, when the line spacing wheel and controlling member will be caused to turn together a distance corresponding to a line feed movement between the first and second lines on the stencil card. Fig. 13 represents the parts as they appear at the completion of this movement. From this figure it will be seen that the spring detent 157 has snapped back of and is interposed in the path of the tooth 156ª on the controlling member so as to prevent a return movement of said controlling member under the action of its spring 153. The controlling member therefore is retained in the rotative position to which it has been moved by the pawl 141 while the pawl and arm 140 return to normal position when the operator releases the handle 125 and the latter is returned to normal position under the action of its spring 124ª.

The operator will next proceed to write the second line on the stencil card which at this time is properly positioned to receive the second line of writing. After this line is completed the parts represented in Fig. 14 will be disposed as shown in this figure. The operator will then actuate the handle 125 in the manner hereinbefore described, returning the carriage to the right to begin a new line of writing and automatically actuating the crank arm 140 to move it from the position shown in Fig. 14 to that indicated in Fig. 16. It will be seen from Fig. 14 that prior to this actuation the controlling member 150, in its previous shifting movement, has changed its position relatively to the line spacing wheel so that the dwell 155 on the controlling member no longer forms a continuation of the dwell 146 and no longer completely covers the opening in advance of the third tooth 145 on the line spacing wheel. Therefore when the pawl 141 reaches the opening in advance of the third tooth it enters this opening and engages the abrupt forward face which connects the dwell 155 to the body portion of the controlling member. The further movement of the pawl 141 will therefore advance the controlling member relatively to the line spacing wheel until the first tooth 145 is reached by the pawl when the controlling member and line spacing wheel will be moved together a distance corresponding to the space between the second and third lines on a stencil sheet. The parts appear as represented in Fig. 15 when the stencil sheet is in position to receive the third line of writing. It will be seen from this figure that the pawl or detent 157 engages back of the dwell 155a to hold the controlling member against reverse rotation under the action of its spring 153. The third line may now be written and after its completion the parts will appear as represented in Fig. 16. From this figure it will be seen that at this time the pawl 141 engages the first tooth of the second set of teeth 145a on the line spacing wheel and is in the rear of the tooth 156a on the controlling member, so that at this time the pawl is ineffective to move the controlling member through a direct engagement therewith. The next actuation of the handle 125 is effective to move the line spacing wheel and the parts controlled thereby from the position shown in Fig. 16 to that represented in Fig. 17. In other words, at this time the line spacing wheel turns with the crank arm substantially throughout the entire extent of movement of the latter. This relatively long rotative movement of the line spacing wheel is effective to move a stencil card up into position to receive the first line of writing, as indicated in Fig. 4. The previously written card is by this same movement moved from its position in front of the platen to the position indicated by the uppermost card in Fig. 4, where it remains until the actuation of the handle 125 to position a card at the platen to receive the second line of writing. This movement is effective to move the parts from the position represented in Fig. 4 to that indicated in Fig. 6 when a release of the uppermost set of spring fingers or arms 115 is effected and a discharge of the written card is automatically brought about in the manner previously described, and as represented in Fig. 6. It will be understood that during the advance movement of the line spacing wheel from the position shown in Fig. 16 to that represented in Fig. 17, such advance movement of the wheel takes place independently of the controlling member until each of the screws 151 carried by the line spacing wheel reaches an end of its slot 152 in the controlling member. Then the latter is taken up and moves with the line spacing wheel, thus reestablishing the normal relation between the line spacing wheel and the controlling member, as shown in Fig. 12.

In the next series of movements of the line spacing wheel and controlling member the teeth 145a and 156a and dwells 155a and 146a come into operation, it being understood that a card is fed from the first writing line position to the position of the uppermost card in Fig. 4 and another card is brought to the first writing line positioned at each half revolution of the line spacing wheel 143. The series of operations illustrated in Figs. 12 to 17 inclusive show the successive steps effected by the spacing mechanism for writing a card, for discharging a previously written card, for moving the last written card to the uppermost position shown in Fig. 4 and for bringing the next card into position to receive the first line of writing, as indicated in Fig. 4. It will be understood that in these successive movements the controlling member 150 is always stepped forwardly in the same direction by the intermittent actuations of the pawl 141; that the detent 157 prevents a reverse or backward movement of the controlling member under the power of its spring 153 but that at a half rotation of the line spacing wheel the normal relation is again established between the controlling member and the line spacing wheel.

I have provided means for preventing an overthrow of the line spacing wheel in order to prevent an inaccurate positioning of the stencil cards at successive operations of the handle 125. This mechanism is independent of the line spacing wheel 143 and the pawl 141 and comprises a ratchet wheel 159 having a hub 160 tapped to receive a screw 161. This ratchet wheel is supported on the shaft 111 near the right-hand end thereof, as shown in Fig. 11, and is secured to the shaft by a reduced end 162 of the screw 161 engaging in an opening formed in the shaft. This ratchet wheel is illustrated in detail in Fig. 19 from which it will be seen that it is provided with two sets of teeth 163, 164, there being three teeth in each set. A pawl 165 (see Figs. 3, 12 and 13) is formed as a part of a pin 166 which projects from the right-hand face of the member 132. This pawl is fixed to the member 132 and during the back and forth movements of the latter is adapted to move into and out of engagement with the teeth 163, 164 on the locking wheel 159, as these teeth are brought successively into the path of the pawl, as will be understood from an inspection of Figs. 12, 13, 15 and 17. The pawl 165 is timed in its movement so as to be projected into the path of one of the teeth 163, 164 at about the termination of the actuating movement of the member 132 controlled by the line spacing handle 125. Any tendency of the line spacing wheel and the parts controlled thereby to advance further than the requisite distance by an overthrow movement is blocked by the pawl 165 extending into the path of one of the teeth on the locking wheel 159.

As hereinbefore pointed out the pawl 141 is caused to co-act with the associated parts with which it engages by a spring 141ª which, as will be understood from an inspection of Figs. 3 and 12, is fixed at one end by a screw 168 to the crank arm 140 and has an angular extension or projection 169 at its free end which overlaps and bears against the pawl 141 near the engaging nose of the latter.

The carriage is adapted to move over the top plate and to carry with it the platen, the card feeding devices and the hopper. The range of this movement of the carriage corresponds approximately to the length of a line to be written on the stencil sheet 76 within the frame 75 of a card. The movement of the carriage from right to left or in the direction of its feed will be arrested by a stop 170 (Fig. 3) secured to the top plate of the machine by a screw 171 and adapted to engage at its ends the left-hand side or supporting plate 60 and thus limit the movement of the carriage.

In the present construction I have provided automatically operating means for variably arresting the carriage in its return movement to begin a new line of writing, the carriage being arrested at positions which are progressively nearer the center of the machine at different return movements of the carriage. This margin stop mechanism is best illustrated in Figs. 3, 9, 11 and 21 to 24 inclusive, the last mentioned group of figures showing the details of the construction. A bracket 172 is secured to the right-hand supporting plate 60 by screws 173. This bracket has an arm 174 which extends to the right and constitutes a support for a screw pivot 175. From an inspection of Fig. 9 it will be seen that this screw 175 passes freely through an opening in one side member or ear 176 of a sheet metal pawl or stop member designated as a whole by the reference numeral 177. The opposite parallel wall 178 of this pawl is tapped to receive the threaded end 179 of the pivot screw 175. This screw also passes freely through an opening in the projection 174 and receives a bearing therein by which the pawl is pivotally supported in place. The upper wall of the pawl which joins the two side members 176 and 178 is adapted to bear upon the upper surface of the projection 174 (Fig. 11) to limit the downward movement of the pawl. This pawl or stop member has an engaging nose 180.

A bracket plate 181 is secured by screws 182 to the top plate 3 of the machine near the right-hand side thereof. The bracket plate is formed with an upwardly extending plate-like projection 183 provided with a series of teeth or stops 184, 185 and 186. These stops are in the nature of ratchet teeth which incline from right to left and form in effect a ratchet bar or rack. The pawl 177, traveling with the carriage, normally has a path of movement which is indicated by the dotted line showing of said pawl in Fig. 22. The upper edge of the plate 183 at the inner end thereof is beveled at 187 in order to lift the pawl against its own weight when the end of the pawl is brought into coöperation with the bevel. Ordinarily an arrest of the carriage would be effected by the pawl entering the space to the left of the tooth 184 which is the first tooth the pawl would encounter in its movement to the right with the carriage. However, I have provided controlling means for controlling the engagement of the pawl with the different stops or teeth 184, 185 and 186. The controlling means in the present instance comprises a controlling member, device or shield 188 which is in the nature of a slide and has a rectilinear movement, being supported by headed screws 189 which extend through a slot 190 and are received at their threaded ends in tapped openings in the plate 183. This sliding plate is provided with three teeth or engaging portions 191, 192 and 193. Intermediate these engaging portions the upper edge of the controlling member is provided with dwells 194, 195 and 196. A contractile spring 197 is connected at one end to a pin or hook 198 which projects from the plate 183, the opposite end of the spring being connected to a pin 199 which projects from one side of the controlling member 188. The force of this spring is exerted to pull the controlling member to the left.

A pawl 200 is pivoted by a headed screw 201 to the controlling member. The engaging nose 202 of this pawl is adapted to coact with ratchet teeth 203 formed on a block 204 which is fixed to the plate 183 by screws 205. The ratchet teeth 203 terminate in a cam 206 formed on the upper front edge of the block and with which the engaging nose on the pawl is adapted to co-act. This pawl is forced into engagement with its ratchet teeth by a wire spring 207 fixed at one end to the controlling member 188 by a screw 208. The opposite end of the spring is received in an opening 209 (see Fig. 22) formed in the pawl 200. A leaf spring 210 is fixed to the bracket plate 181 by rivets 211. The left-hand end of this spring is bent forwardly and then upwardly and then rearwardly to form a flat upper portion 212 which overlies the engaging nose of the pawl 200 and forms a controlling device. Normally the portion 212 of the spring 210 is free from engagement with the nose 202 of the pawl but as the controlling member is moved to the right relatively to the stop carrying member 183, the engaging portion of the pawl will be brought into contact with the lower face of the part 212 of the spring, as shown in Fig. 23, thus elevating the free end of the spring. A movement of the controlling member from the position shown in Fig. 23 to that indicated in Fig. 24 is effective to cause the pawl 200 to lift the spring and after the engaging portion of the pawl is withdrawn from beneath it to allow the spring to resume its normal position. At this time the engaging portion of the pawl in its return movement is adapted to contact with the upper side of the part 212 of the spring, thereby maintaining the pawl out of engagement with the ratchet teeth 203 during the return movement of the controlling member 188, as indicated by dotted lines in Fig. 24. It being understood that Fig. 21 shows the normal positions of the parts, and that these parts are disposed as shown when the carriage is moved to the right to begin the first line of writing, it will be seen that in this movement of the carriage the pawl 177 will engage the dwells 194 and 195 on the controlling member, the pawl thereby being prevented from entering the notches of the first two teeth 184 and 185 but that when the pawl reaches the opening in front of the tooth 186 it will enter this opening, engaging the face 193 on the controlling member and moving said member to the right with the stop or pawl 177 until the latter is arrested by engaging the fixed stop 186. This movement of the controlling member is effective to carry the pawl 200 with it from the position shown in Fig. 21 to that represented in Fig. 22, which shows the disposition of the parts at the termination of the movement of the carriage to the right to begin the first line of writing. The pawl 200 engaging the first of the teeth 203 will retain the controlling device 188 in the position to which it has been shifted. The operator proceeds to write the first or name line and when this is completed the operator will again move the carriage to the right through an actuation of the handle 125 and at this time the controlling device 188 being in the position shown in Fig. 22 the dwell 194 will prevent the pawl 177 from engaging the notch in advance of the first tooth 184 but will enable the pawl to enter the notch in advance of the tooth 185. As the pawl enters this second notch it will engage the contact portion 192 on the controlling device, thus moving the controlling device from the position shown in Fig. 22 to that represented in Fig. 23, which last mentioned figure shows the disposition of the parts at the termination of the second return movement of the carriage to begin the second line of writing.

A comparison of Figs. 22 and 23 will show that the carriage is arrested in its second return movement at an earlier period than in the return of the carriage for the first line of writing, thus properly arresting the carriage so as to offset the beginning of the second line or the first line of the address. The parts are substantially in the position represented in Fig. 23 when the carriage is returned the second time. This will leave the controlling member 188 in the position shown in Fig. 23, where the dwell 194 no longer prevents the pawl 177 from entering the notch in advance of the first tooth 184 on the next return movement of the carriage. After the second line has been completed the carriage will be returned to the right and the pawl 177 will enter the notch in advance of the first tooth 184 and will engage the face or contact portion 191 on the controlling member, forcing the latter to the right and carrying with it the pawl 200. The pawl 200 at this time moves up the incline 206 and releases itself from engagement with the spring member 212, as shown in Fig. 24. This view represents the parts as they appear at the termination of the return movement of the carriage to begin the third line of writing. As hereinbefore explained, when the controlling portion 212 is lifted by the engaging nose 202 of the pawl 200, in the movement of the latter to the position shown in full lines in Fig. 24, the part 212, as soon as released from the control of the pawl 200, will be returned to normal position by its spring 210 so that the pawl 200 is prevented during the return movement of the controlling device 188 from engaging with the ratchet teeth 203. As the carriage moves to the left in writing the third line the controlling device 188 under the power of its spring 197 will move to the left until the right-hand end of the slot 190 in the controlling member engages the right-hand screw 189.

At about the termination of the return movement of the slide 188 the pawl will pass the left-hand end of the contact member 212 and will be forced to the lowermost position shown in Fig. 21. It will be seen, therefore, that during the writing of the third line the controlling device 188 and the pawl 200 will return to the normal position which they occupied prior to returning the carriage for beginning the first line of writing. It will be understood that the arrest of the carriage in its movement to the right, through the coöperation of the pawl 177 with the stop or tooth 184, effects an arrest of the carriage at an earlier point in its return movement than is effected by the coöperation of the pawl with the stop 185, so that a further offsetting of the beginning of the third line of writing is effected.

It will be seen from the foregoing description that the controlling member 188 is intermittently actuated by the movement of the carriage to the right to control the engagement of the pawl with the stops or teeth 184, 185 and 186 and that the carriage is arrested at points progressively nearer the left-hand side of the machine while arresting the carriage preparatory to writing the three lines to be inscribed on the stencil plate. While I have shown but three stops 184, 185 and 186, it should be understood that any suitable number of such stops may be employed, appropriate modification of the controlling member 188 being made accordingly.

The range of the carriage movement, as hereinbefore explained, corresponds substantially to the length of the card or to the dimensions of the card from one side edge thereof to the other. It should be understood, therefore, that the feed rack 42 need only be of a corresponding length. This will best be understood from reference to Figs. 1, 4 and 9, from which it will be seen that the feed rack 42 is secured to the bar 62 by screws 213.

Referring to Figs. 1 and 3, it will be observed that I have provided a repulser to prevent the type bars from sticking at the printing point when a needle faced type punctures the stencil sheet. In the present instance this repulser comprises a spring wire 214 which extends horizontally across the type basket below the printing line. This spring wire 214 is connected at its ends to contractile springs 215 which in turn are connected to brackets 216 secured by screws 217 to the top plate of the machine. The wire 214 extends into the path of all of the type bars in their movements to the printing position and is adapted to be flexed by the type bars in such movements, the re-action of the spring wire 214 and the coiled springs 215 insuring a release of the needle faced type from the stencil sheet and a quick return of the actuated type bar to the type rest.

Having described the construction and arrangement of the various parts, a brief description of the operation of the machine as a whole will be given. Understanding that Figs. 1, 3, 4, 9, 11, 12 and 22 represent the parts substantially as they appear after the first line of writing on a card has been produced, the operator will actuate the handle 125, thereby returning the carriage to the right to effect a single line spacing operation of the feed devices to bring the card at the platen in position to receive the second line of writing. At this time the previously written card is discharged from the machine into the receiving receptacle A, as shown in Figs. 6 and 10. The controlling member 150 of the line spacing mechanism is automatically shifted in the manner hereinbefore described by this operation as is the controlling member 188 of the margin stop mechanism. The second line is written on the card at the printing line and as the carriage is again shifted to the right to begin a new line of writing the parts will be disposed as they are represented in Figs. 6, 14 and 23. This movement again automatically effects an actuation of the controlling member 150 of the line spacing mechanism in the manner hereinbefore explained and also automatically effects an actuation of the controlling member 188 of the margin stop mechanism. The third line is then written, the parts appearing as represented in Figs. 16 and 24, the last mentioned figure showing the parts disposed as they appear after the line has been completed and the carriage has again been returned to the right through an actuation of the handle 125. This actuation of the handle is effective to produce a long feed movement of the endless carriers or bands 108 to bring the next card to be written into position opposite the platen to receive the first line of writing thereon. The same movement brings about a reëstablishment of the normal relation between the controlling member 150 and the line spacing ratchet wheel 143, as has been previously described. It also brings about a reëstablishment of the normal relation between the controlling member 188 of the margin stop mechanism and the arresting means 183 with which the margin stop or pawl 177 co-acts. The cards are thus fed successively from the hopper in a curved path around and beneath the platen and are brought successively into position in front of the platen to receive the impact of the upwardly and rearwardly striking type bars against the front face of the platen, and as the actuating handle is operated to move the card at the printing line into position to receive the second line of writing, the previously written card will be automatically discharged from the machine. It will be seen that the cards in their feed movements from the hopper to the point of discharge are guided and fed in a curved circuit around the platen but nevertheless are maintained at all times in a flat condition.

The control of the parts is entirely automatic under an actuation of the handle 125, the controlling member 150 operating automatically to determine the extent of feed which may be transmitted to the card feeding devices to bring them successively to the printing line to effect a line spacing movement of the card at the printing line and to discharge the cards from the machine. The controlling member 188 of the margin stop mechanism is also automatically controlled to bring about an arrest of the carriage at successive movements thereof to the right at positions which are successively nearer the left-hand side of the machine in order to arrest the carriage at the proper positions to begin the different lines of the name and address to be written on the card. Moreover, the return of the controlling devices 150 and 188 to their normal positions relatively to the members 143 and 183 respectively is automatically brought about during the return movement of the carriage under control of the handle 125 after the third line on the card has been written. In short, the operator merely has to actuate the handle 125 successively to return the carriage to begin a new line of writing and to write the names and addresses on the cards. The control of the cards otherwise in their movements from the support or hopper to the point of discharge is automatically effected. By this construction the mind of the operator is entirely relieved of any work incident to the proper positioning of the cards and the removal thereof from the machine and the cards may be rapidly written and positioned in the machine with mechanical accuracy to receive the different lines of writing on each card.

From the foregoing description it will be understood that I have provided a simple front strike writing machine in which the stencil writing is effected in full view of the operator; that the cards are never handled by the operator except to fill the supply hopper; that the cards remain in a flat condition in their passage through the machine; that there is no liability of injuring the thin stencil sheets on the cards in the passage of the latter through the machine, and that the machine is highly efficient in use and enables an operator to write a large number of cards in a short time since none of the operator's time is occupied in introducing the cards individually into the machine, positioning them therein and removing them after they are written.

The mechanism for effecting a feed of the cards and the margin stop mechanism of the present invention have many features in common and there are generic claims included herein which may be predicated equally well on either construction. Thus each mechanism includes a toothed device, a coöperating pawl, and automatically operating controlling means for determining with which tooth of the toothed device said pawl or co-acting member shall coöperate. Each mechanism also includes means for restraining the controlling means in different positions to which it may be shifted, or a detent for holding the controlling member against the power of its spring, and also automatically operating means for reëstablishing the normal relation between the controlling member and the toothed member after a given number of actuations of said controlling member. In each case the controlling member is in the nature of a toothed device which is actuated by the same pawl that co-acts with the other toothed member. In each case the controlling member is in the nature of a shield which prevents the coöperating pawl from engaging certain teeth of a toothed member and in each case the shield is automatically actuated to determine with which tooth of the toothed member the pawl shall engage. In each case the pawl (141 or 177) coöperates with a toothed member which is in the nature of a rack. It will be understood, therefore, that various changes may be made in the construction and the action of the devices without departing from the spirit of my invention, and that certain of the devices may be employed without others. Thus from certain aspects of my invention it is immaterial what character of means are employed to rotate the endless carriers and from certain other aspects of the invention it is immaterial what form of mechanism is controlled by the devices shown in Figs. 12 to 20 and in Figs. 21 to 24.

More specific claims than those included herein and directed to the margin stop mechanism shown in the accompanying drawings are embodied in a divisional application Serial No. 774,761 filed June 20th, 1913.

What I claim as new and desire to secure by Letters Patent, is:—

1. In a typewriting machine, the combination of key actuated printing instrumentalities, and means for feeding a work sheet in a flat condition to the printing line in a curved path, said means including line spacing devices for effecting a step-by-step line spacing movement of the work sheet.

2. In a typewriting machine, the combination of key actuated printing instrumentalities, a support for a plurality of work sheets, and means for feeding said sheets successively from said support to the printing line in a curved path and while the work sheets remain in a flat condition, said means including line spacing devices for effecting a step-by-step line spacing movement of the work sheet.

3. In a typewriting machine, the combination of a carriage, a support for a plurality of work sheets, said support being carried by the carriage, means for feeding the work sheets successively from said support to the printing line while the sheets remain in a flat condition, and means for causing each sheet in its movement to the printing line to describe a curved path.

4. In a typewriting machine, the combination of a movable platen, means for controlling the letter space movement of said platen, and means for feeding work sheets up and around said platen while the sheets remain in a flat condition.

5. In a typewriting machine, the combination of a platen, key actuated printing instrumentalities, and means for feeding work sheets around beneath the platen and up in front of the same while the work sheets remain in a flat condition, said means including devices which engage the work sheet only near the side edges thereof.

6. In a typewriting machine, the combination of a carriage, a platen carried thereby, means for supporting a plurality of work sheets on the carriage, means for successively feeding the work sheets beneath and around up in front of the platen while the sheets remain in a flat condition, and means for guiding said sheets in the path described.

7. In a typewriting machine, the combination of a carriage, a platen carried thereby, means arranged in the rear of the platen for supporting a plurality of work sheets, and means for feeding work sheets successively from said support beneath and to the front of the platen while the sheets remain in a flat condition, said means including devices which engage the work sheet only near the side edges thereof.

8. In a typewriting machine, the combination of a movable platen, means for controlling the letter feed movement of the platen, and means independent of the platen for feeding work sheets up and around said platen while the sheets remain in a flat condition.

9. In a typewriting machine, the combination of a platen, key actuated printing instrumentalities, a work sheet support in the rear of and above the platen, and means for feeding and for guiding a flat work sheet from said support beneath and around the platen and for discharging the sheet to the rear of and above the platen while the work sheet in such passage from the support to the point of discharge remains in a flat condition.

10. A typewriting machine including means for feeding a work sheet in a flat condition to the printing line in a curved path and for effecting a step-by-step line spacing movement of the sheet at the printing line, said means comprising a rotative carrier, and means carried thereby for engaging a work sheet and moving it with said carrier.

11. A typewriting machine including key actuated printing instrumentalities, and means for feeding a work sheet in a flat condition to the printing line in a curved path, said means comprising a spring arm operative to engage a work sheet and move it in the direction of its feed.

12. A typewriting machine including means for feeding a work sheet in a flat condition to the printing line, said means comprising an endless flexible carrier, and an arm carried thereby and movable relatively thereto, said arm being provided with means to engage the work sheet.

13. A typewriting machine including means for feeding a work sheet in a flat condition to the printing line, said means comprising an endless carrier, and a spring arm carried thereby and movable relatively thereto, said arm being operative to engage the work sheet.

14. A typewriting machine including means for feeding work sheets in a flat condition to the printing line, said means comprising an endless band, and a plurality of spring arms carried by said band and operative to engage the work sheets successively and cause them to move with said band.

15. A typewriting machine including means for feeding work sheets in a flat condition to the printing line, said means comprising an endless band, a plurality of spring arms carried by said band and operative to engage the work sheets successively and cause them to move with said band, and guides coöperative with said work sheets as they are moved by said arms.

16. In a typewriting machine, the combination of a platen; key actuated printing instrumentalities; and means for feeding a work sheet to and past the platen, said means comprising a revoluble carrier, and a member carried by said carrier and adapted to engage a work sheet, said member at one time conforming to the contour of the carrier and at another time extending at an angle to the surface thereof.

17. A typewriting machine including means for feeding a work sheet to the printing line and for effecting a line spacing movement of the sheet past the printing line, said means comprising an endless carrier, a member carried by said carrier and having means for engaging a work sheet, said member at one time conforming to the contour of the carrier and at another time extending at an angle to the surface thereof, and guiding means coöperative with said member to control the movement thereof by which it conforms at one time to the contour of the carrier and at another time extends at an angle to the surface thereof.

18. A typewriting machine including means for feeding a work sheet to the printing point, said means comprising an automatically actuated carrier, and a resilient arm carried by said carrier and adapted to automatically engage and move a work sheet to the printing point and in position to receive the first line of writing.

19. A typewriting machine including means for feeding a work sheet to the printing point, said means comprising an automatically actuated carrier, a resilient arm carried by said carrier and adapted to automatically engage a work sheet, and move it to the printing line, and guiding means with which said arm co-acts to change the relation of said arm to the carrier.

20. A typewriting machine including key actuated printing instrumentalities, and means for feeding a work sheet to the printing point, said means comprising a revoluble carrier, and a series of spring arms carried by said carrier and each of which is adapted to engage a work sheet.

21. A typewriting machine including means for feeding a work sheet to the printing point, said means comprising a revoluble carrier, a series of spring arms carried by said carrier and each of which is adapted to engage a work sheet, and guiding means with which said spring arms co-act to change the relation of the arms to the carrier.

22. A typewriting machine including key actuated printing instrumentalities and having means for feeding a work sheet to the printing point, said means comprising a movable endless band, arms carried by said band and each of which engages a work sheet and has its angular relation to the endless band changed during the movement of the band, and work sheet engaging means carried by each arm.

23. A typewriting machine including work sheet feeding means, said means comprising a resilient device which moves a work sheet past the printing line, means for maintaining the resilient device flexed and for releasing it after the work sheet passes the printing line so that the reaction of the resilient device is effective to discharge the work sheet from the machine.

24. A typewriting machine including automatically operating means for feeding work sheets to the printing line, said means being operative to effect a step-by-step line feed of the sheet at the printing line and to shoot the work sheets from the machine after they pass the printing line.

25. A typewriting machine including key actuated printing instrumentalities and having means for feeding work sheets in a flat condition to and away from the printing line, the same means which feed the work sheets to the printing line being operative to shoot the work sheets from the machine after they leave the printing line.

26. A typewriting machine including means for feeding cards or the like in a flat condition to and away from the printing line, said means comprising a carrier, an arm carried by said carrier and adapted to engage a card and move it to and away from the printing line, means for placing said arm under spring power and for releasing it after a card passes the printing line and thereby shooting the engaged card from the machine.

27. A typewriting machine including means for feeding work sheets to and away from the printing line, said means comprising an endless carrier, a series of spring arms each adapted to engage a work sheet and move it to and past the printing line, and means for successively flexing said spring arms and for releasing them and successively shooting the work sheets from the machine after they are moved past the printing line.

28. In a typewriting machine, the combination of a platen; a container for a plurality of cards or the like; means for moving the cards along said container; and means for feeding the cards successively from said container to and past the platen and for discharging them from the machine after they leave the platen, said feeding means comprising an endless carrier, spring arms carried by said carrier and each adapted to engage a card and move it past the platen, and means for successively flexing said spring arms and releasing them to shoot the cards from the machine after the latter pass the platen.

29. In a typewriting machine, the combination of a platen; a container for a plurality of cards or the like; means for moving the cards along said container; and means for feeding the cards successively from said container to and past the platen and for discharging them from the machine after they leave the platen, said feeding means comprising an endless carrier, spring arms carried by said carrier and each adapted to engage a card and move it past the platen, means for successively flexing said spring arms and for releasing them to shoot the cards from the machine after the latter pass the platen, and intermittently actuated means for moving said endless carrier.

30. A typewriting machine including means for feeding cards or the like to the printing line, said means comprising a pair of rotative drums, endless bands which are maintained spaced apart and pass around said drums, card carrying devices carried by said bands and adapted to engage the cards and move them with the bands to the printing line, and intermittently actuated means for rotating said drums.

31. In a typewriting machine, the combination of means for feeding cards or the like to the printing line, said means comprising a pair of rotative drums, endless bands which are maintained spaced apart and which pass around said drums, card carrying devices carried by said bands and adapted to engage the cards and move them with the bands, and intermittently actuated means for rotating said drums; and a platen interposed between said drums and surrounded by said bands.

32. In a typewriting machine, the combination of a carriage; a platen carried thereby; and means carried by the carriage for feeding cards or the like to and past the platen, said means comprising a plurality of drums, endless bands passing around said drums, engaging devices carried by said bands and each adapted to engage a card or the like, and means for intermittently rotating said drums, said platen being interposed between said drums and surrounded by said bands.

33. In a front-strike typewriting machine, the combination of a carriage; a platen carried thereby and presenting an impact face to the front of the machine for the action of the printing instrumentalities; and means carried by the carriage for feeding cards or the like to and past the platen, said means comprising a plurality of drums, endless bands passing around said drums, engaging devices carried by said bands and each adapted to engage a card or the like, and means for intermittently rotating said drums, said platen being interposed between said drums and surrounded by said bands.

34. In a typewriting machine, the combination of a curved guide coöperative with a work sheet to direct it to the printing line, and means for moving a work sheet along said guide to the printing line while the sheet remains in a flat condition.

35. In a typewriting machine, the combination of a platen, a continuous curved guiding surface along which a work sheet may be guided in a flat condition to and from the platen, and means for moving a work sheet in a flat condition along said guiding surface to and from the platen.

36. In a typewriting machine, the combination of curved guide coöperative with a work sheet to direct it to the printing line, and intermittently actuated means for moving a series of work sheets one after another along said guide to the printing line while the sheets remain in a flat condition.

37. In a typewriting machine the combination of a guide coöperative with a work sheet, and a work sheet carrier which is surrounded by said guide and coöperates with a work sheet to move it along said guide in a flat condition to the printing line.

38. In a typewriting machine, the combination of a work sheet guide, a platen contained within said guide, and a work sheet carrier also contained within said guide and operative to move a work sheet along said guide to the platen.

39. In a typewriting machine, the combination of a support for a plurality of work sheets, a platen, a guide extending from said work sheet support around said platen to the point of discharge of the work sheets from the machine, and a work sheet carrier around which said guide extends and which is operative to effect a step-by-step line feed movement of the work sheets and to move the work sheets successively along said guide from said support past the printing line and to the point of discharge of the work sheets from the machine.

40. In a typewriting machine, the combination of a support for a plurality of flat work sheets, a platen, a curved guide extending from said work sheet support around said platen to the point of discharge of the work sheets from the machine, and a work sheet carrier around which said curved guide extends and which is operative to move the work sheets successively in a flat condition along said guide from said support past the printing line and to the point of discharge of the work sheets from the machine.

41. In a typewriting machine, the combination of a support for a plurality of work sheets, a relatively fixed platen, a relatively fixed guide extending from said work sheet support around said platen to the point of discharge of the work sheets from the machine, a work sheet carrier around which said guide extends and which is operative to move the work sheets successively along said guide from said support past the printing line and to the point of discharge of the work sheets from the machine, and intermittently actuated means for moving said carrier.

42. In a typewriting machine, the combination of a handle, an actuated member, an actuating member controlled by said handle and coöperative with said actuated member to move it, and an automatically operating device for varying the extent of movement that may be transmitted to the actuated member by an actuation of the handle.

43. In a typewriting machine, the combination of a toothed device, a co-acting member which at each operation coöperates with a tooth of said toothed device, and automatically operating means for determining with which tooth of the toothed device said co-acting member shall coöperate.

44. In a typewriting machine, the combination of a toothed device, a co-acting pawl which at each operation coöperates with a tooth of said toothed device, controlling means for determining with which tooth of the said toothed device said pawl shall co-act, and means by which said controlling means is automatically shifted.

45. In a typewriting machine, the combination of a toothed device, a co-acting pawl which at each operation coöperates with a tooth of said toothed device, controlling means for determining with which tooth of the said toothed device said pawl shall co-act, means by which said controlling means is automatically shifted, and means for restraining said controlling means in different positions to which it may be shifted.

46. In a typewriting machine, the combination of a toothed device, a co-acting pawl, a controlling member for determining with which tooth of said toothed device said pawl shall co-act, a spring connected to said controlling member, a detent for holding said controlling member against the power of said spring, and means by which said controlling member is automatically shifted.

47. In a typewriting machine, the combination of a toothed device, a co-acting pawl, which at each operation coöperates with a tooth of said toothed device, a shield for preventing the engagement of said pawl with certain of the teeth of said toothed device, and means by which said shield is automatically shifted relatively to said toothed device.

48. In a typewriting machine, the combination of a toothed device, a co-acting pawl, which at each operation coöperates with a tooth of said toothed device, a shield for preventing the engagement of said pawl with certain of the teeth of said toothed device, means by which said shield is automatically shifted relatively to said toothed device, and means by which the normal relation between said shield and toothed device is attained after a predetermined number of actuations of said shield has been effected.

49. In a typewriting machine, the combination of a movable toothed device, a co-acting pawl for moving said toothed device, a shield for preventing the engagement of said pawl with certain of the teeth of said toothed device, means by which said shield is automatically shifted relatively to said toothed device, means for restraining said shield against return movement from different positions to which it may be shifted, and means by which the normal relation between said shield and toothed device is automatically attained after a predetermined number of actuations of said shield has been effected.

50. In a typewriting machine, the combination of a member, a second member movable relatively to and engageable with said first mentioned member, and automatically actuated controlling means for varying the point in the throw of said relatively movable member when it shall become effective and engage the other member.

51. In a typewriting machine, the combination of a member, a second member movable relatively to and engageable with said first mentioned member, a controlling device movable independently of said first mentioned member and determining at what part in the throw of said relatively movable member it shall become effective and engage the other member, and means by which a movement of said controlling device is automatically effected to vary the point in the throw of the relatively movable member when it shall engage the other member.

52. In a typewriting machine, the combination of a movable pawl, a coöperative rack, a relatively shiftable controlling member for determining at what point in the movement of the pawl it shall be rendered effective and with what tooth of the rack the pawl shall co-act, and means by which said controlling member is automatically shifted to vary the point in the movement of the pawl when it engages the rack.

53. In a typewriting machine, the combination of a pawl, a coöperative rack, a relatively shiftable controlling member for determining with what tooth of the rack the pawl shall co-act at each actuation of the platen, and means by which said pawl is rendered effective to shift said controlling member.

54. In a typewriting machine, the combination of a pawl, a coöperative rack, a relatively shiftable controlling member for determining with what tooth of the rack the pawl shall co-act, means by which said pawl is rendered effective to shift said controlling member, a spring connected to said controlling member, means for restraining said controlling member against the action of said spring, and means which enable the normal relation between the controlling member and said rack to be effected.

55. In a typewriting machine, the combination of a handle, a rotative actuated member, a rotative actuating member controlled by said handle and coöperative with said actuated member to rotate it, and an automatically operating rotative device for varying the extent of movement that may be transmitted to the actuated member by an actuation of the handle.

56. In a typewriting machine, the combination of a rotative toothed device, a co-acting member coöperative therewith at each operation, and automatically operating rotative means for determining with which tooth of the rotative toothed device said co-acting member shall coöperate.

57. In a typewriting machine, the combination of a movable toothed device, a co-acting pawl operative at each actuation to move said toothed device, controlling means for determining with which tooth of the said movable toothed device said pawl shall co-act, and means by which said controlling means is automatically shifted.

58. In a typewriting machine, the combination of a rotative toothed device, a co-acting pawl, a rotative controlling member for determining with which tooth of said toothed device said pawl shall co-act, a spring connected to said controlling member, a detent for holding said controlling member against the power of said spring, and means by which said controlling member is automatically and intermittently rotated.

59. In a typewriting machine, the combination of a movable toothed device, a co-acting pawl for moving said toothed device at each actuation of said pawl, a shield for preventing the engagement of said pawl with certain of the teeth of said toothed device, and means by which said shield is automatically shifted relatively to said toothed device.

60. In a typewriting machine, the combination of a movable member, a second member movable relatively to and engageable with said first mentioned member and adapted to move it, and automatically actuated controlling means for determining at what part in the throw of said second member it shall engage the other member and thus automatically vary the extent of movement transmitted to one of said members by the other.

61. In a typewriting machine, the combination of a pawl, a coöperative rotative rack, a relatively rotative controlling member for determining with what tooth of the rack the pawl shall co-act at each operation, and means by which said controlling member is automatically and rotatively shifted.

62. In a typewriting machine, the combination of a platen, and means independent of the platen for effecting a feed of the work sheets, said means comprising an actuating handle, and automatically operating means by which said handle is effective to give a longer extent of feed at one time than at another.

63. Work sheet feed mechanism for typewriting and like machines including a handle, and automatically operating means for effecting different extents of feed of a work sheet at different actuations of said handle, said automatically operating means comprising an actuating member under control of said handle, an actuated member, and controlling means for affording an engagement between the actuating member and the actuated member at different points in the throw of the actuating member.

64. Work sheet feed mechanism for typewriting and like machines including a handle, and automatically operating means for effecting different extents of feed of a work sheet at different actuations of said handle, said automatically operating means comprising an actuating member under control of said handle, an actuated member, controlling means for affording an engagement between the actuating member and the actuated member at different points in the throw of the actuating member, and means by which said controlling means may be intermittently stepped forward at successive actuations of said handle.

65. Work sheet feed mechanism for typewriting and like machines including a handle, and automatically operating means for effecting different extents of feed of a work sheet at different actuations of said handle, said automatically operating means comprising an actuating member under control of said handle, an actuated member, controlling means for affording an engagement between the actuating member and the actuated member at different points in the throw of the actuating member, means by which said controlling means may be intermittently stepped forward at successive actuations of said handle, and means for restraining said controlling means against return movement from different positions to which it may be moved.

66. Work sheet feed mechanism for typewriting and like machines including a handle, and automatically operating means for effecting different extents of feed of a work sheet at different actuations of said handle, said automatically operating means comprising an actuating member under control of said handle, an actuated member, controlling means for affording an engagement between the actuating member and the actuated member at different points in the throw of the actuating member, and automatically operating means for changing the relation between said controlling means and the actuated member at successive operations of said handle.

67. Work sheet feed mechanism for typewriting and like machines including a handle, and automatically operating means for effecting different extents of feed of a work sheet at different actuations of said handle, said automatically operating means comprising an actuating member under control of said handle, a rotative actuated member, and a rotative controlling member for affording an engagement between the actuating member and the rotative actuated member at different points in the throw of the actuating member.

68. Work sheet feed mechanism for typewriting and like machines including a handle, and automatically operating means for effecting different extents of feed of a work sheet at different actuations of said handle, said automatically operating means comprising an actuating member under control of said handle, a rotative actuated member, a rotative controlling member for affording an engagement between the actuating member and the rotative actuated member at different points in the throw of the actuating member, and means by which said controlling member may be intermittently rotated at successive actuations of said handle.

69. Work sheet feed mechanism for typewriting and like machines including a handle, and automatically operating means for effecting different extents of feed of a work sheet at different actuations of said handle, said automatically operating means comprising an actuating member under control of said handle, a rotative actuated member, a rotative controlling member for affording an engagement between the actuating member and the rotative actuated member at different points in the throw of the actuating member, means by which said controlling member may be intermittently rotated at successive actuations of said handle, and means for restraining the controlling member against backward rotation.

70. Work sheet feed mechanism for typewriting and like machines including a handle, and automatically operating means for effecting different extents of feed of a work sheet at different actuations of said handle, said automatically operating means comprising an actuating member under control of said handle, a toothed actuated member with which the actuating member co-acts at each operation of the handle, and controlling means for determining with which tooth of the actuated member said actuating member shall engage at each operation of the handle.

71. Work sheet feed mechanism for typewriting and like machines including a handle, and automatically operating means for effecting different extents of feed of a work sheet at different actuations of said handle, said automatically operating means comprising an actuating member under control of said handle, a toothed actuated member with which the actuating member co-acts at each operation of the handle, and an automatically and intermittently actuated controlling member for determining with which tooth of the actuated member said actuating member shall engage at each operation of the handle.

72. Work sheet feed mechanism for typewriting and like machines including a handle, and automatically operating means for effecting different extents of feed of a work sheet at different actuations of said handle, said automatically operating means comprising an actuating member under control of said handle, a rotative toothed actuated member with which the actuating member co-acts at each operation of the handle, and a rotative controlling member for determining with which tooth of the actuated member said actuating member shall engage at each operation of the handle.

73. Work sheet feed mechanism for typewriting and like machines including a handle, and automatically operating means for effecting different extents of feed of a work sheet at different actuations of said handle, said automatically operating means comprising a pawl actuated by said handle, a toothed member actuated by said pawl at each operation of the latter, and a controlling member for determining with which tooth of the toothed member said pawl shall co-act at each actuation of the handle.

74. Work sheet feed mechanism for typewriting and like machines including a handle, and automatically operating means for effecting different extents of feed of a work sheet at different actuations of said handle, said automatically operating means comprising a pawl actuated by said handle, a toothed member actuated by said pawl, a controlling member for determining with which tooth of the toothed member said pawl shall co-act at each actuation of the handle, and means by which said controlling member may be automatically and intermittently actuated at successive operations of said handle.

75. Work sheet feed mechanism for typewriting and like machines including a handle, and automatically operating means for effecting different extents of feed of a work sheet at different actuations of said handle, said automatically operating means comprising a pawl actuated by said handle, a toothed member actuated by said pawl, and a controlling member for determining with which tooth of the toothed member said pawl shall co-act at each actuation of the handle, said pawl being operative on the controlling member to vary the position thereof relatively to said toothed member.

76. Work sheet feed mechanism for typewriting and like machines including a handle, and automatically operating means for effecting different extents of feed of a work sheet at different actuations of said handle, said automatically operating means comprising a pawl actuated by said handle, a ratchet wheel actuated by said pawl, and a rotative controlling member for determining with which tooth of said ratchet wheel said pawl shall co-act.

77. Work sheet feed mechanism for typewriting and like machines including a handle, and automatically operating means for effecting different extents of feed of a work sheet at different actuations of said handle, said automatically operating means comprising a pawl actuated by said handle, a ratchet wheel actuated by said pawl, and a rotative controlling member for determining with which tooth of said ratchet wheel said pawl shall co-act, said pawl coacting with said controlling member to change the relation between the controlling member and ratchet wheel.

78. Work sheet feed mechanism for typewriting and like machines including a handle, and automatically operating means for effecting different extents of feed of a work sheet at different actuations of said handle, said automatically operating means comprising a pawl actuated by said handle, a ratchet wheel actuated by said pawl, and a rotative controlling member for determining with which tooth of said ratchet wheel said pawl shall co-act, said controlling member having teeth thereon with which said pawl co-acts, the pawl being effective to rotate said controlling member and to displace it relatively to said ratchet wheel.

79. In a typewriting machine, the combination of a platen; and work sheet feed mechanism for feeding work sheets independently of the platen, the same comprising an actuating handle, a reciprocatory rack controlled thereby, a pinion controlled by said rack, a pawl controlled by said pinion, a line spacing wheel controlled by said pawl, and a card carrier controlled by said line spacing wheel.

80. Work sheet feed mechanism for typewriting machines comprising an actuating handle, a reciprocatory rack controlled thereby, a pinion controlled by said rack, a pawl controlled by said pinion, and a wheel having differently spaced teeth with which said pawl co-acts.

81. Work sheet feed mechanism for typewriting machines comprising an actuating handle, a reciprocatory rack controlled thereby, a pinion controlled by said rack, a mutilated wheel, and means controlled by a rotative movement of said pinion in one direction for transmitting movement at each operation to said mutilated wheel.

82. Work sheet feed mechanism for typewriting machines comprising an actuating handle, a toothed wheel, means controlled by said handle for turning said wheel, a disk arranged adjacent to said toothed wheel and having a dwell thereon for controlling the engagement between said handle-controlled means and the toothed wheel, and means by which said disk may be caused to turn with the toothed wheel or to turn independently thereof to vary the point in the throw of said handle-controlled means where its engagement with the toothed wheel may be effected.

83. Work sheet feed mechanism for typewriting machines comprising an actuating handle, a toothed wheel, a pawl controlled by said handle for turning said wheel at each actuation of said handle, a disk arranged adjacent to said toothed wheel and having a dwell thereon with which said pawl co-acts for controlling the engagement between said pawl and the toothed wheel and varying the extent of turning movement that may be transmitted to said wheel, and means by which said disk is automatically turned relatively to the toothed wheel.

84. Work sheet feed mechanism for typewriting machines comprising an actuating handle, a toothed wheel, means controlled by said handle for turning said wheel, a disk arranged adjacent to said toothed wheel and having a dwell thereon for controlling the engagement between said handle-controlled means and the toothed wheel, and means by which said disk is automatically and intermittently advanced relatively to the toothed wheel to automatically vary the point in the throw of said handle-controlled means where its engagement with the toothed wheel may be effected.

85. Work sheet feed mechanism for typewriting machines comprising an actuating handle, a line spacing ratchet wheel, a pawl controlled by said handle for turning said wheel, and automatically operating positively acting means separate and distinct from said pawl and ratchet wheel for preventing an overthrow of the latter.

86. In a typewriting machine, the combination of a container for a plurality of cards or the like, a follower in said container, a spring carried by and traveling with said follower, and means with which said spring is wound by a movement of the follower in one direction and is unwound by a movement of the follower in the opposite direction, said means comprising a band operatively connected at one end to the container and at its opposite end to said spring.

87. In a typewriting machine, the combination of a container for a plurality of cards or the like, a follower in said container, a spring, a drum operatively connected to said spring, and a band which winds on said drum.

88. In a typewriting machine, the combination of a container for a plurality of cards or the like, a follower in said container, a spring carried by said follower, a drum carried by said follower and operatively connected to said spring, and a band which is anchored at one end and is operatively connected at the other end to said drum.

89. In a typewriting machine, the combination of a container for a plurality of cards or the like, a follower in said container, a spring for moving said follower, a rotative spindle around which said spring is wound, a drum on said spindle, and a band which winds on said drum and is connected thereto.

90. In a typewriting machine, the combination of a container for a plurality of cards or the like, a follower in said container, a spindle which is carried by said follower, a drum on said spindle, a spring which surrounds said spindle and is operatively connected at one end to said follower and at the opposite end to said drum, and a band which is anchored at one end and is operatively connected at its opposite end to said drum.

91. In a typewriting machine, the combination of a container for a plurality of cards or the like, a follower in said container, a spindle which is carried by and rotates on said follower, a drum fixed to said spindle, a spring which surrounds said spindle and is connected at one end to said follower and at the opposite end to said drum, and a band which is anchored at one end to the container and is connected at its opposite end to said drum.

92. In a typewriting machine, the combination of a platen, key actuated printing instrumentalities, and relatively fixed guiding means by and along which a work sheet is guided in a curved path in its movement to the platen and while the work sheet remains in a flat condition.

Signed at the borough of Manhattan, city of New York, in the county of New York, and State of New York, this 7th day of March A. D. 1913.

ARTHUR W. SMITH.

Witnesses:
CHARLES E. SMITH,
E. M. WELLS.